(12) United States Patent
Liang et al.

(10) Patent No.: US 7,616,881 B2
(45) Date of Patent: Nov. 10, 2009

(54) ZOOM FLASH WITH LIQUID CRYSTAL LENS

(75) Inventors: Rongguang Liang, Penfield, NY (US);
Xiang-Dong Mi, Rochester, NY (US);
David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 304 days.

(21) Appl. No.: 11/695,734

(22) Filed: Apr. 3, 2007

(65) Prior Publication Data
US 2008/0247743 A1 Oct. 9, 2008

(51) Int. Cl.
G03B 15/06 (2006.01)
G03B 15/02 (2006.01)
G02B 3/12 (2006.01)
F21V 9/14 (2006.01)

(52) U.S. Cl. .................. 396/175; 359/666; 362/17; 362/18; 362/19; 362/355

(58) Field of Classification Search ......... 396/175–178, 396/61, 62; 362/3, 16, 18, 19, 355; 359/665–667, 359/599; 257/100
See application file for complete search history.

(56) References Cited

U.S. PATENT DOCUMENTS

| | | | |
|---|---|---|---|
| 5,666,564 A | 9/1997 | Albrecht | |
| 6,278,845 B1 | 8/2001 | Terada | |
| 6,598,986 B2 | 7/2003 | Yano | |
| 7,382,976 B1 * | 6/2008 | Mok et al. | 396/62 |
| 2002/0009297 A1 | 1/2002 | Tanabe | |
| 2004/0037549 A1 | 2/2004 | Yano | |

OTHER PUBLICATIONS

Hongwen Ren, et al, "Tunable-focus flat liquid crystal spherical lens". Applied Physics Letter, vol. 84, No. 23, pp. 4789-4791.
Hongwen Ren, et al, "Tunable-focus cylindrical liquid crystal lens", Japanese Journal of Applied Physics vol. 43, No. 2, 2004, pp. 243-244.
Hongwen Ren, et al, "Adaptive liquid crystal lens with large focal length tunability", Optics Express, vol. 14, No. 23, pp. 11292-11298.

* cited by examiner

*Primary Examiner*—Rochelle-Ann J Blackman
(74) *Attorney, Agent, or Firm*—Nelson A. Blish; Peyton C. Watkins (57) ABSTRACT

A camera apparatus (10) has a zoom lens (12) having a zoom focus setting that is adjustable over a range of focus values and control circuitry for generating a variable voltage potential according to the zoom focus setting. A flash illumination apparatus (20) has a light source (32) and a variable focus liquid crystal lens (24), the variable focus liquid crystal lens (24) having a first and a second solid optical element (40, 50), chamber (44), the two electrodes (42, 48) and liquid crystal material (46). A variable voltage is applied to the liquid crystal material (46) for the lens power according to the zoom focus setting.

13 Claims, 9 Drawing Sheets

ZOOM FLASH WITH LIQUID CRYSTAL LENS

FIELD OF THE INVENTION

This invention generally relates to photographic flash apparatus and more particularly relates to flash apparatus capable of operation at variable scene coverage angles.

BACKGROUND OF THE INVENTION

In photography, there is a recognized need for providing flash illumination at an angle that is suited to the scene coverage angle of a zoom lens. The photographic zoom lens capable of a range of focus from telephoto to wide angle settings and provides the best image quality when the flash illumination angle is adjusted to correspond to the scene coverage angle. At a telephoto setting, for example, the optimum flash illumination is substantially well collimated. At its other extreme, a wide angle setting, the preferred flash illumination also has a relatively wide angle.

A number of methods for providing flash illumination at adjustable angles have been proposed. Conventional approaches vary the spatial relationship of the flash light source relative to the supporting illumination optics. For example, one way to change the scene coverage angle of the flash is to move the flash lamp along the optical axis of the flash reflector. As the lamp is moved away from the back of the reflector, the pattern of light is spread to cover a larger area. A disadvantage to this method is that the flash lamp must be moved mechanically. If the movement mechanism allows the flash lamp to move off-axis with respect to the optical axis of the reflector, then the pattern of illumination also shifts as a function of the location of the flash lamp with respect to the reflector.

Yet another method for changing the scene coverage angle is to position a lens at a variable position in front of the reflector along its optical axis. This approach is used, for example, to provide a variable strobe illumination angle, as disclosed in U.S. Pat. No. 6,598,986 and U.S. Patent Application Publication No. 2004/0037549 (both by Yano). This method can be effective, but requires that there be sufficient clearance in front of the reflector in order for the lens to travel along its optical axis. In addition, a mechanism for supporting and moving the lens is required.

Similar approaches using variable lens positioning include the use of retracting cylindrical lens arrays that can be suitably positioned according to camera focus, as disclosed in U.S. Patent Application Publication No. 2002/0009297 (Tanabe). Yet another technique adapts flash illumination angle by varying the relationship of a pair of wave lenses, as disclosed in commonly-assigned U.S. Pat. No. 5,666,564 (Albrecht). While these and related methods have merit for adapting the flash illumination angle for many applications, they require at least some level of mechanical movement and may not be easily adaptable, particularly for compact cameras. Solutions such as that disclosed in U.S. Pat. No. 6,278,845 (Terada), in which components in the finder optics path also serve to provide variable angle flash illumination, can be specifically tailored to individual camera designs, but are not easily implemented in a broad range of camera types.

A still further method changes the scene coverage angle of a flash by changing the shape of the reflector. Depending on how much angular change is needed, the volume of the reflector may change substantially. This provides an opportunity to vary the distribution of light within the scene coverage angle in addition to changing the scene coverage angle itself. While this can be a useful feature, it may require a complex mechanism that is somewhat sensitive and is not easy to operate.

While conventional solutions can provide some measure of variable flash illumination angle, there is felt to be considerable room for improvement. The need for a zoom flash mechanism that is relatively inexpensive and mechanically robust is particularly compelling with the advent of less expensive compact cameras, both digital and film-based.

SUMMARY OF THE INVENTION

Briefly, according to one aspect of the present invention, a camera zoom flash includes: a first solid optical element; a liquid crystal element; a first electrode between the first optical element and the liquid crystal element; a second solid optical element; a second electrode between the liquid crystal element and the second optical element; an electronic controller for applying a voltage across the first and second electrodes; wherein an optical power of the liquid crystal element changes according to the voltage applied; a light source on a side of the first optical element opposite the first electrode; and wherein light passing through the first, liquid crystal element, and second optical elements is redirected by the liquid crystal element.

It is a feature of the present invention that it employs a liquid crystal lens for varying the angle of camera flash illumination.

It is an advantage of the present invention that it allows automatic adjustment of the focus setting for flash illumination, according to the zoom setting of a camera or other factors. The present invention allows embodiments in which flash illumination angle can be automatically adjusted without the need for manual manipulation and adjustment of zoom illumination optics.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The present invention adapts the variable focus capabilities of liquid crystal lens technology for providing flash illumination at a range of scene angles. Exemplary embodiments of variable focus liquid crystal lens technology are disclosed in the following publications:

Hongwen Ren, et al., "Tunable-focus flat liquid crystal spherical lens", Applied Physics Letter, Vol. 84, No. 23, pp. 4789-4791.

Hongwen Ren, et al., "Tunable-focus cylindrical liquid crystal lens", Japanese Journal of Applied Physics Vol. 43, No. 2, 2004, pp. 243-244.

Hongwen Ren, et al., "Adaptive liquid crystal lens with large focal length tunability", Optics Express, Vol. 14, No. 23, pp. 11292-11298.

Three fundamental approaches have been developed for tunable liquid crystal lens: an inhomogeneous electric field applied to an inhomogeneous liquid crystal layer, an inhomogeneous electric field applied to a homogeneous LC layer, and a homogeneous electric field applied to an inhomogeneous LC layer. For each approach, the liquid crystal layer is sandwiched between two indium-tin-oxide (ITO) layers. When a voltage is applied, the inhomogeneous electric field or inhomogeneous liquid crystal material generates a point or line-symmetric refractive index distribution within the liquid crystal material resulting in a focusing behavior.

Among advantages cited for liquid crystal lens technology include compact, no moving part, robustness, fast response with minimal hysteresis, good optical quality and transparency in the visible range, stability over a wide operating range, and low electrical consumption. Applications that have been proposed for liquid crystal variable focal lenses include use as autofocus devices in electronic cameras and sensing equipment. Because lenses of this type can be particularly well suited for compact, portable devices, potential applications for image sensing in medical imaging and telemetry are of particular interest.

For zoom flash application in digital camera, the cylindrical variable focal liquid crystal lens is preferred since the lamp used in digital camera is cylindrical shape and the imaging field is rectangle. In order to produce the cylindrical liquid crystal lens, the ITO electrode is specially designed so that, when a voltage is applied, the liquid crystal layer has a line symmetrical refractive index distribution.

Figure 1:
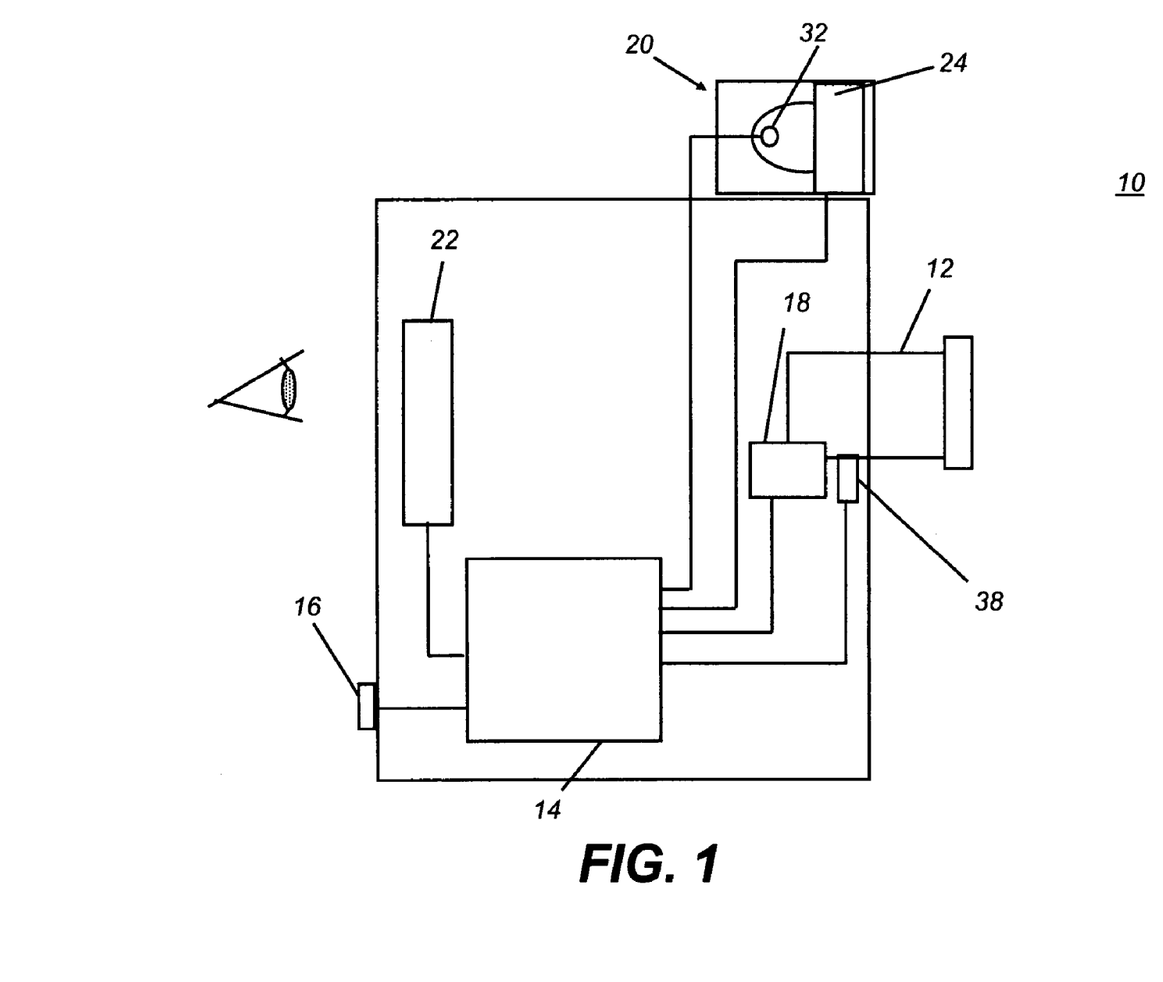
FIG. 1 is a schematic block diagram showing a camera apparatus having a zoom flash apparatus according to the present invention.

Referring to FIG. 1, there is shown an embodiment of a camera apparatus 10 equipped with a zoom lens 12 and using a variable focus flash apparatus 20 having a liquid crystal lens 24. A control logic processor 14, typically including a dedicated microprocessor with its necessary support and interface circuitry, controls and monitors a number of functions within camera apparatus 10. In the embodiment shown, control logic processor 14 drives an actuator 18 that adjusts the position of zoom lens 12. Alternately, where zoom lens 12 is set manually, a positional sensor 38 is deployed to provide a feedback signal based on the zoom lens 12 setting. According to this sensed signal, control logic processor 14 adjusts a control voltage signal provided to variable focus flash apparatus 20 that changes the index distribution of liquid crystal lens in order to provide flash illumination at an appropriate angle.

The typical image capture process using camera apparatus 10 follows the conventional model. Initially, a zoom setting for zoom lens 12 is made, either manually or automatically controlled by control logic processor 14. The operator initiates recording of an image onto a recording medium 22 by actuating a shutter control 16. Recording medium 22 can be a CMOS or CCD detector that connects to or is monitored by control logic processor 14, as shown in FIG. 1, or can be a segment of film or other photosensitive medium. Control logic processor 14 controls the focus setting of liquid lens 24, such as by a control voltage that alters the electrowetting behavior described above. To capture the image, control logic processor 14 flashes a light source 32. The image can then be recorded onto recording medium 22.

It can be readily appreciated by those skilled in the electronic arts that control logic processor 14 and its related components for optionally controlling zoom actuator 18, calculating or obtaining feedback on zoom lens 12 focus position, generating the needed voltage potential to control the index distribution of the liquid crystal lens in flash apparatus 20, and controlling the overall imaging function of camera apparatus 10 can take many forms.

Lens Behavior

Figure 2A:
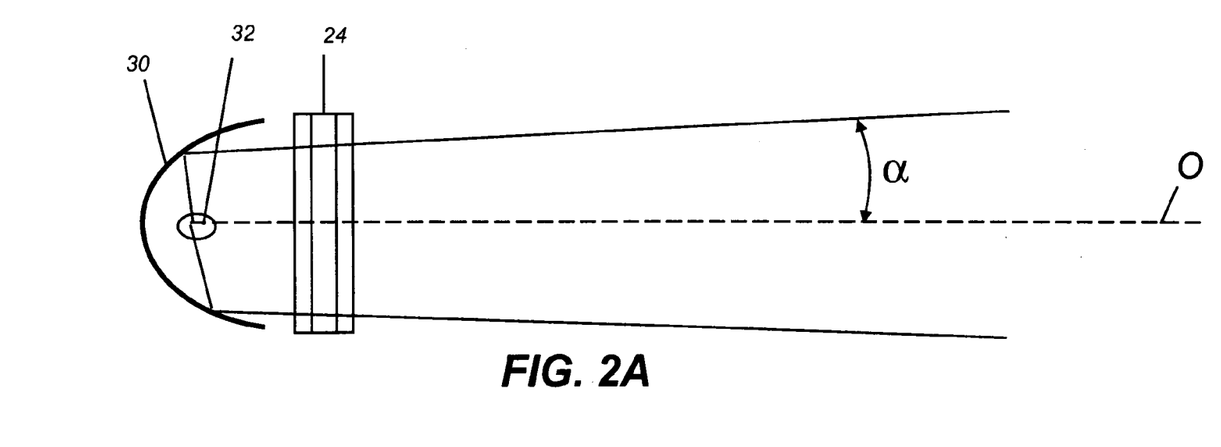
FIG. 2 is a diagram showing how a zoom flash works.
Figure 2B:
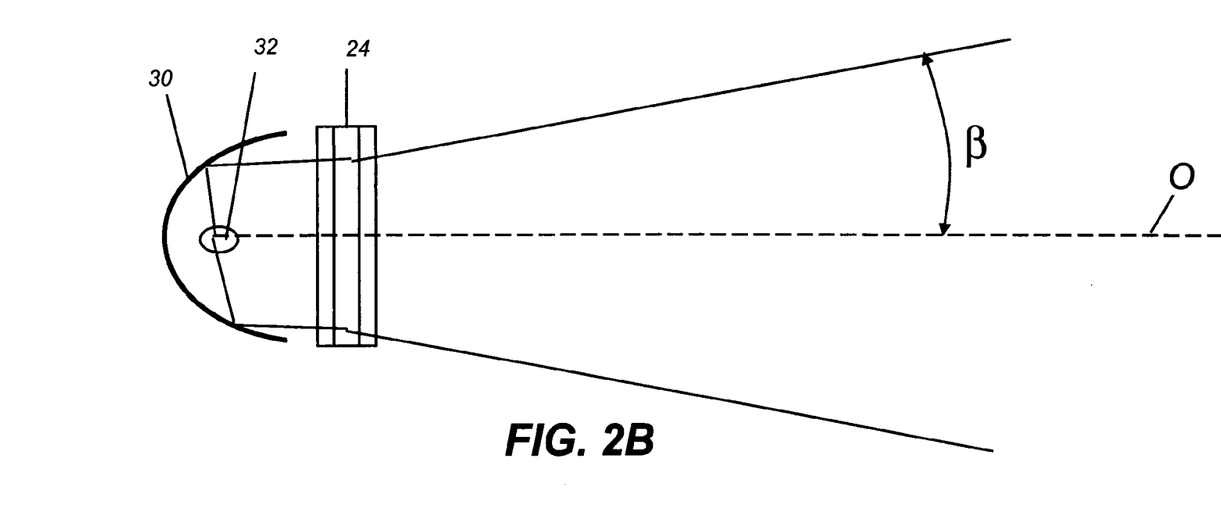

In order to better understand how the apparatus of the present invention operates, it is necessary to understand the refractive function of liquid crystal lens 24 under various conditions. Comparing FIGS. 2A and 2B, light distribution from a light source 32 is nearly collimated after the reflector 30 with a small divergence angle $\alpha$, relative to the optical axis O, shown with a dotted line here and in subsequent figures. In FIG. 2A, no voltage is applied to liquid crystal lens 24; thus, there is essentially no change of the divergence angle from light source 32. By comparison, the result when voltage is applied to liquid crystal lens 24 is shown in FIG. 2B. Here, the incident light from light source 32 is refracted by liquid crystal lens 24, causing significant change of divergence angle $\beta$ of the illumination from the reference optical axis O. With respect to zoom positions, FIG. 2A shows the characteristic behavior of liquid crystal lens 24 at a telephoto position. FIG. 2B shows the characteristic behavior of liquid lens 24 at a wide angle position.

While FIGS. 2A, and 2B show characteristic performance only at extreme telephoto and wide angle positions, liquid crystal lens 24 is capable of variable focus over a continuous range of zoom lens settings between these extremes. The voltage level applied to the liquid crystal lens 24 adjusts the refraction by changing the refractive index in liquid crystal layer according to the position of zoom lens 12, as was described with reference to FIG. 1.

Liquid Crystal Lens 24 Construction

Figure 3A:
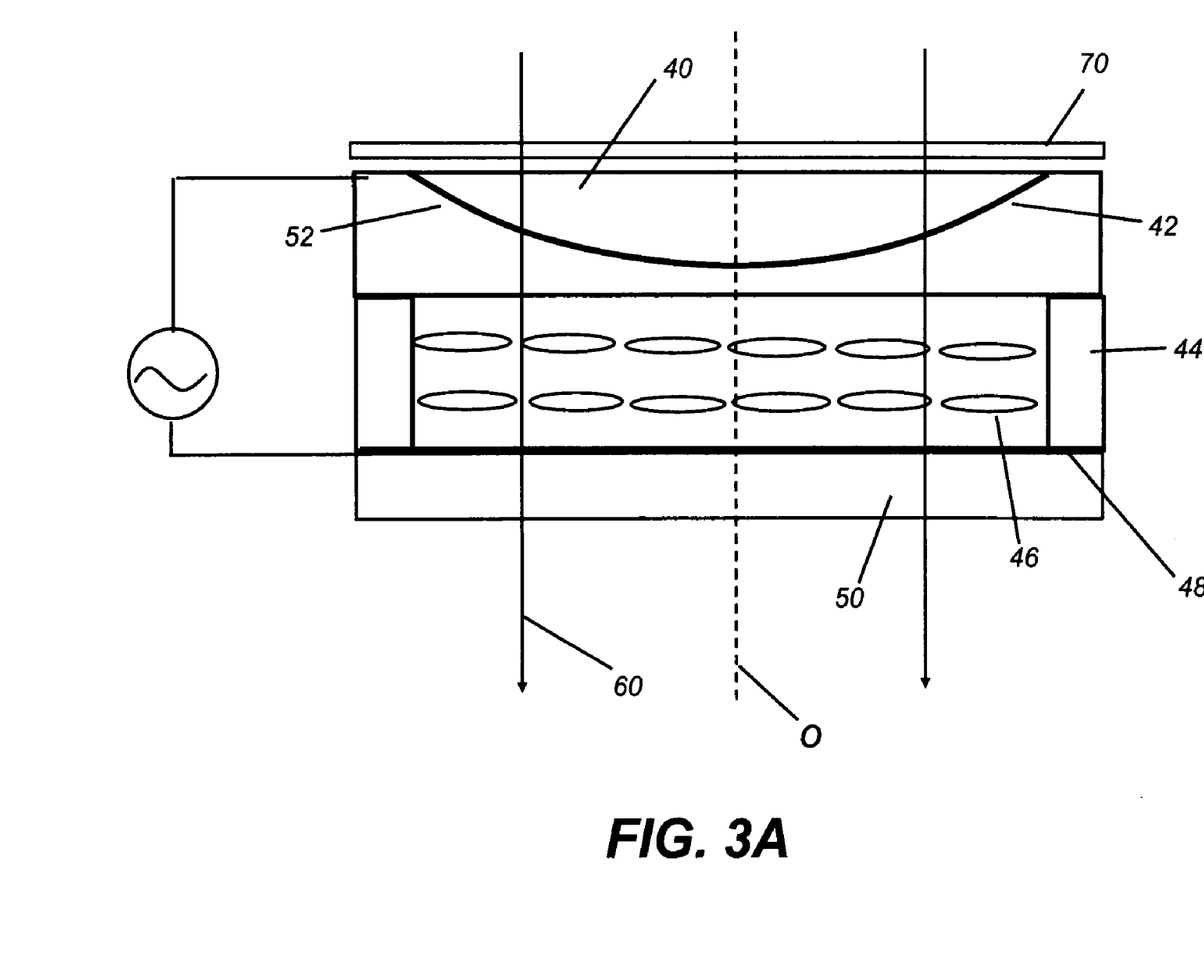
FIGS. 3A and 3B show an embodiment of the variable cylindrical liquid crystal lens.
Figure 3B:
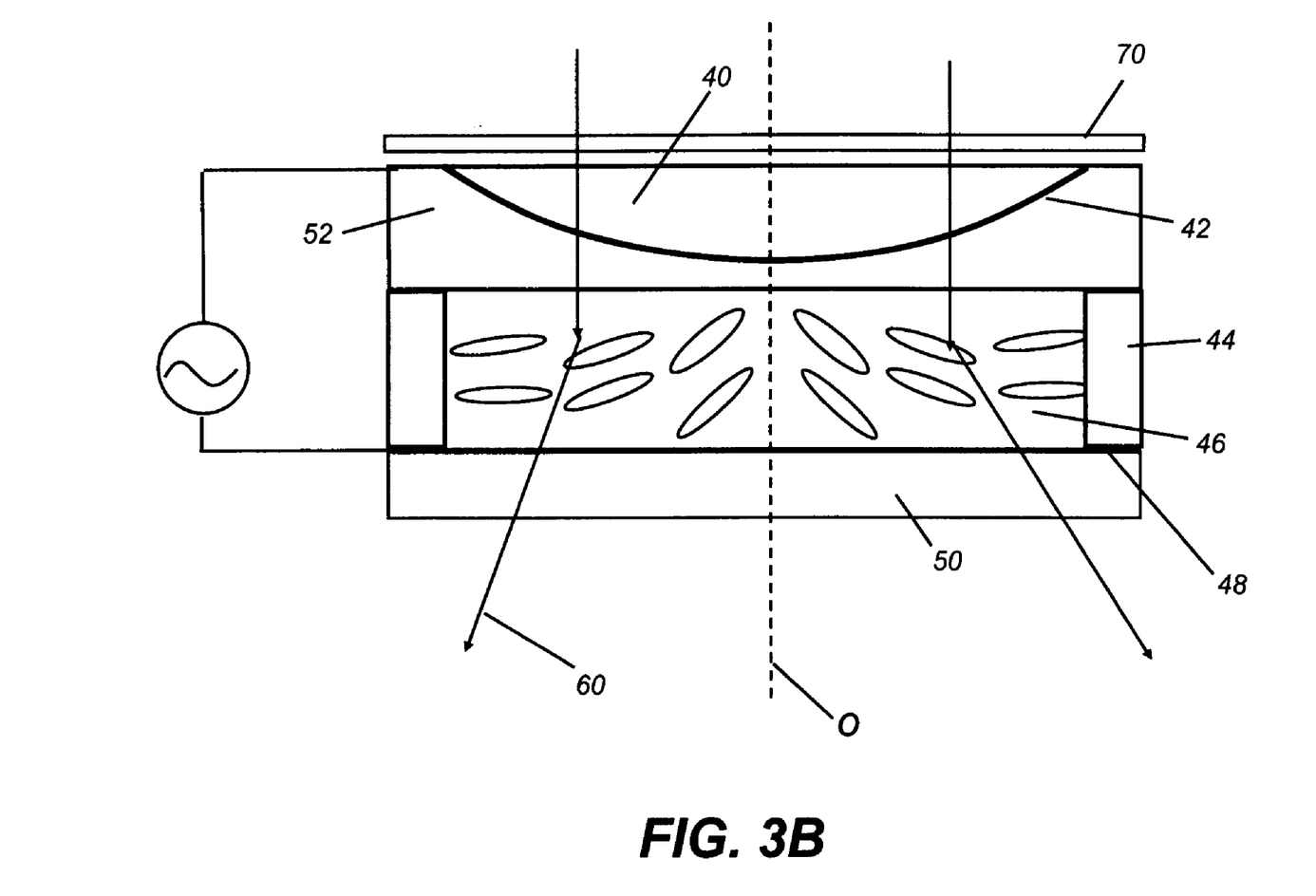

FIGS. 3A and 3B show one embodiment of the liquid crystal variable focal lens. The liquid crystal material 46 is contained in the chamber 44 and sealed by the first solid optical element 40 and second optical element 50. Solid optical elements 40 and 50 can be plastic or glass, for example, borosilicate glass. To form the electrodes, the transparent ITO coating is applied to the surfaces, which are adjacent to the liquid crystal material 46, of the elements 40 and 50. In order to create line symmetrical refractive index distribution in liquid crystal layer, the second surface, which is adjacent to liquid crystal, of the element 40 need to have cylindrical concave or convex shape. The third optical element is the index matching element 52. It can be a solid or liquid optical element; it has an index of refraction that matches an index of refraction of the first optical element. When no voltage is applied to the liquid crystal material 46, the index distribution is uniform across the liquid crystal material 46, which means element 46 does not have refractive power. The ray 60 does not change the direction when it passes through liquid crystal material 46, as shown in FIG. 3A. When a voltage is applied across the liquid crystal layer, the intensity of the electric field is the strongest in the center and weakest in the borders since the variation in contact thickness produces an inhomogeneous applied field. The liquid crystal molecules present a line-symmetrical gradient reorientation across the liquid crystal cell. This is made possible with an alignment layer provided to the interface between the liquid crystal layer and the index matching material 52, the alignment layer generating small tilt angle symmetrical about the optical axis O. The liquid crystal element behaves like a negative cylindrical lens so that the ray 60 diverges after passing the liquid crystal lens. With different applied voltage, the profiles of the refractive index distribution changes, which causes the change of the focal length.

Figure 4A:
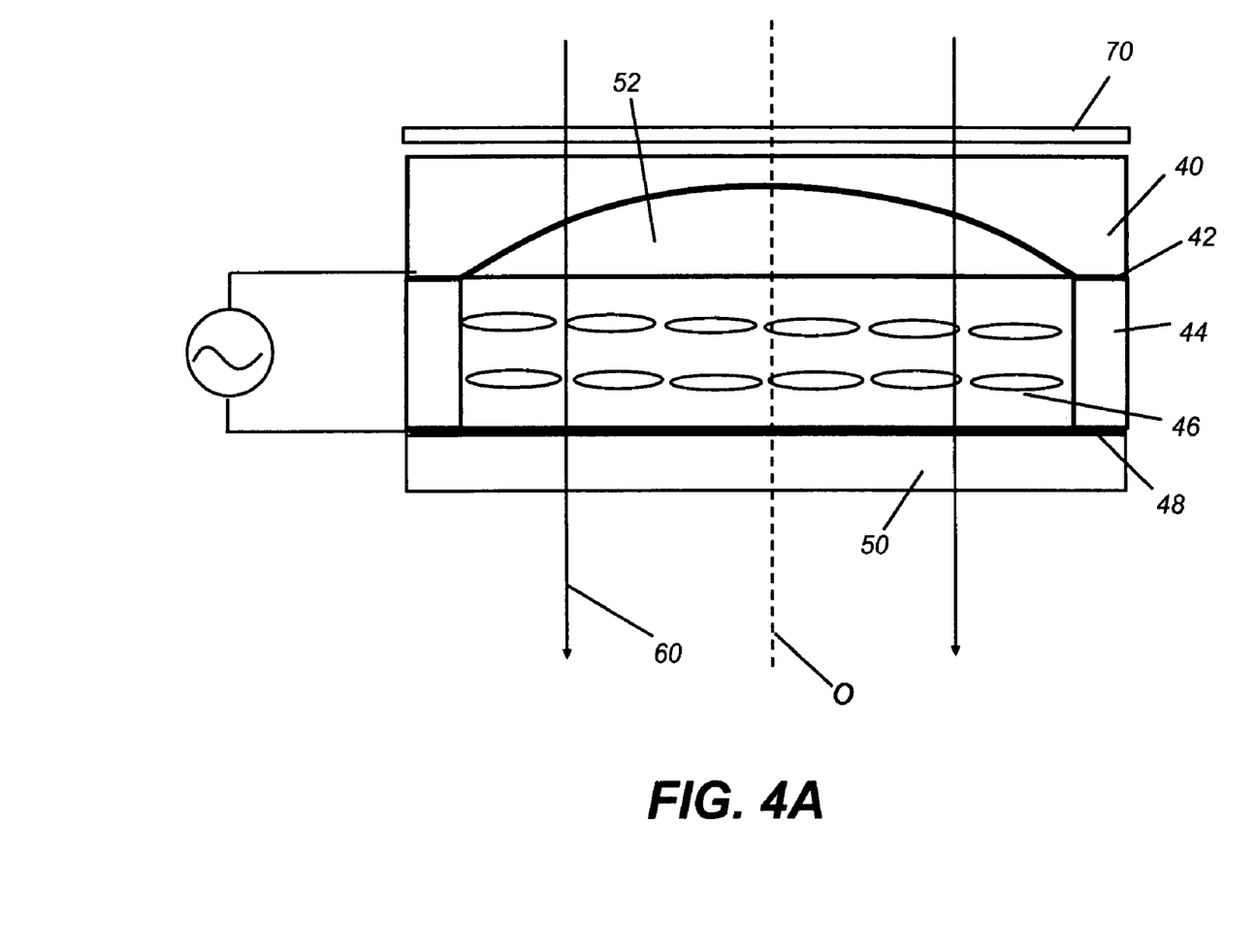
FIGS. 4A and 4B show another embodiment of the variable cylindrical liquid crystal lens.
Figure 4B:
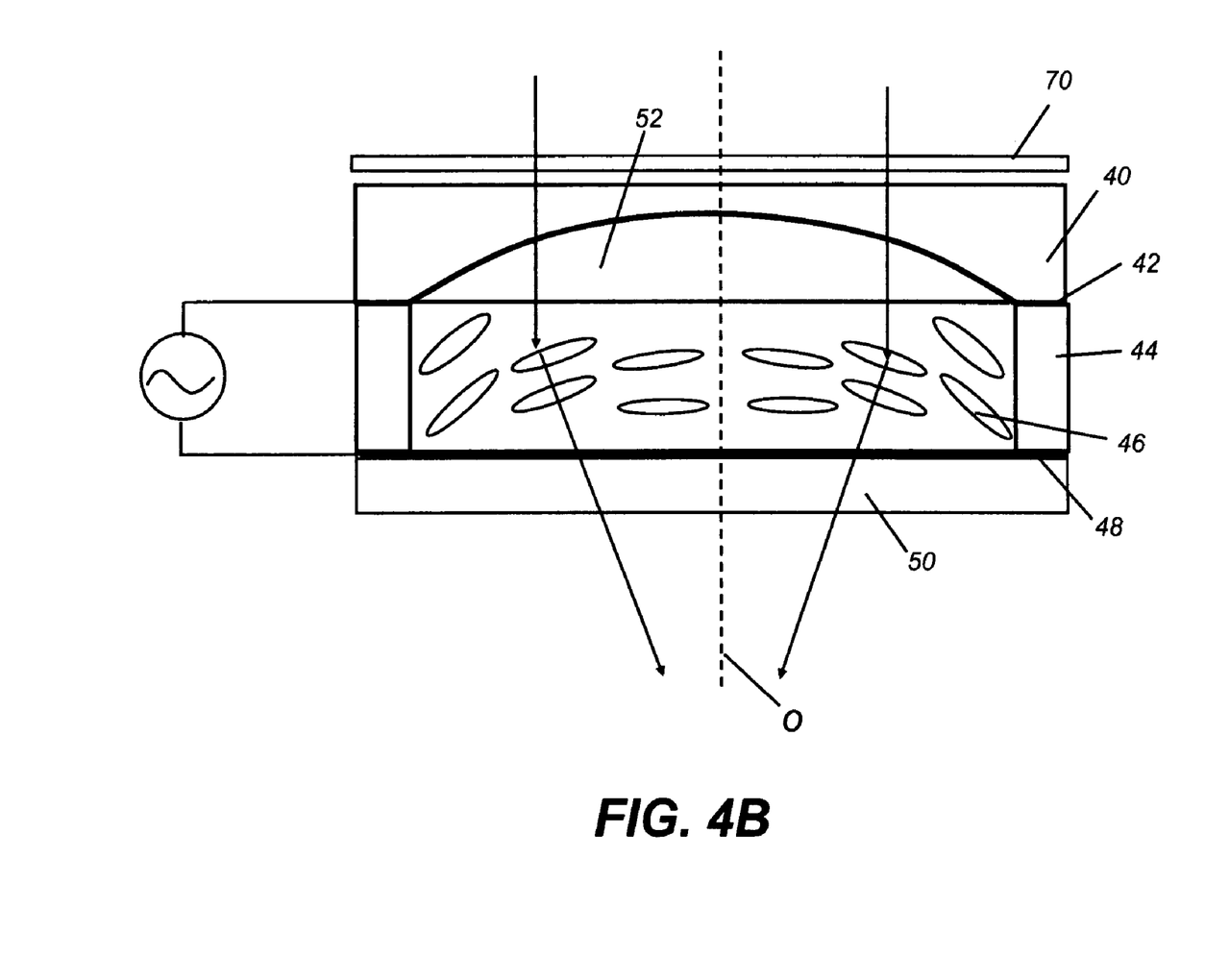

FIGS. 4A and 4B present another embodiment of the liquid crystal lens. Compared to FIG. 3A, the first solid optical element in FIG. 4A has a concave cylindrical shape, instead of convex shape. When no voltage is applied to the liquid crystal lens as shown in FIG. 4A, the incident light passes through the liquid crystal lens without changing the direction. When a voltage is applied, the intensity of the electric field is the strongest in the borders and weakest in the center since the variation in contact thickness produces an inhomogeneous applied field. The liquid crystal molecules present a line-symmetrical gradient reorientation across the liquid crystal element. Referring to FIG. 4B, the liquid crystal element behaves like a positive cylindrical lens and focuses the ray 60 towards the optical axis O.

Figure 5A:
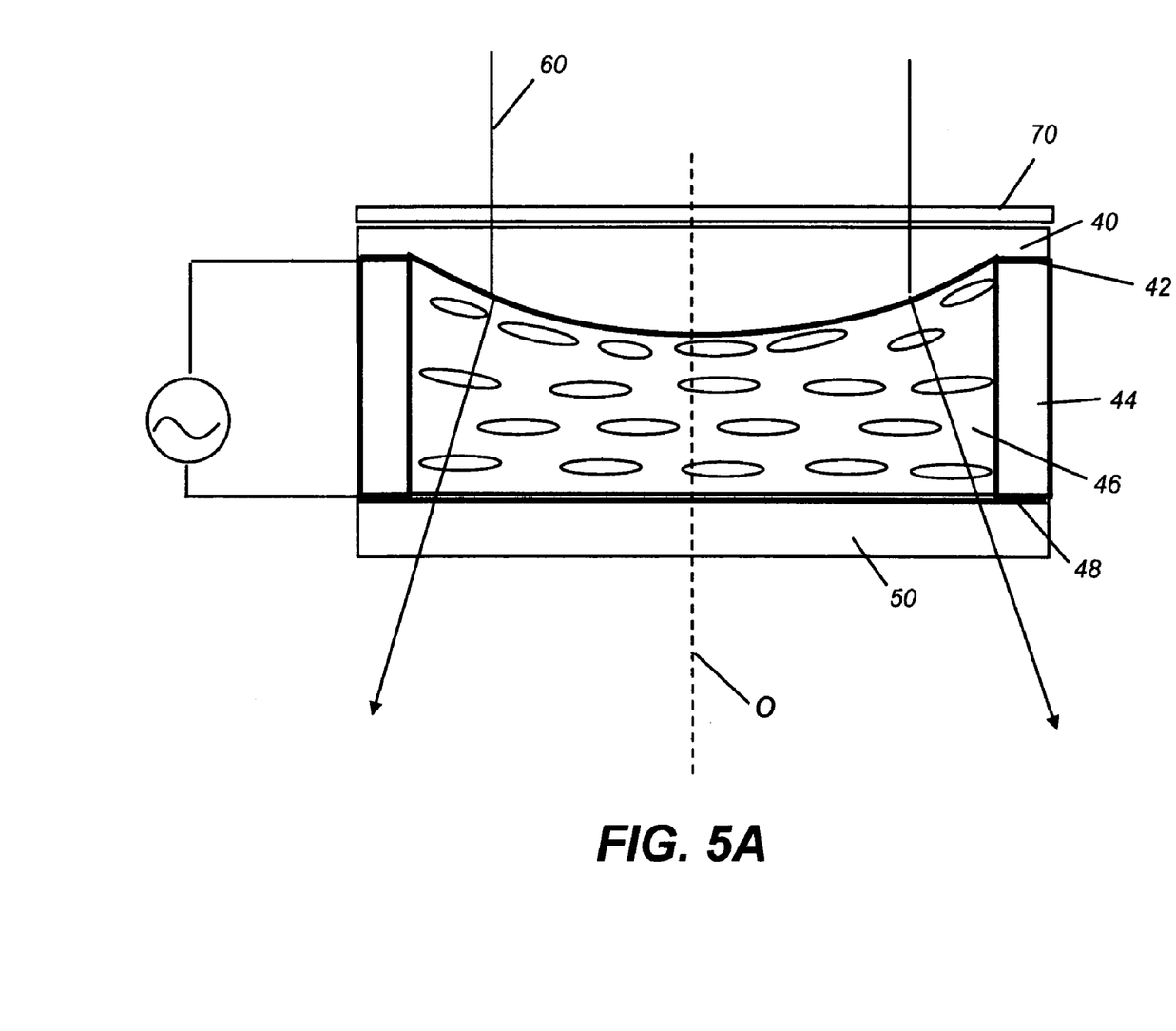
FIGS. 5A and 5B show another embodiment of the variable cylindrical liquid crystal lens.
Figure 5B:
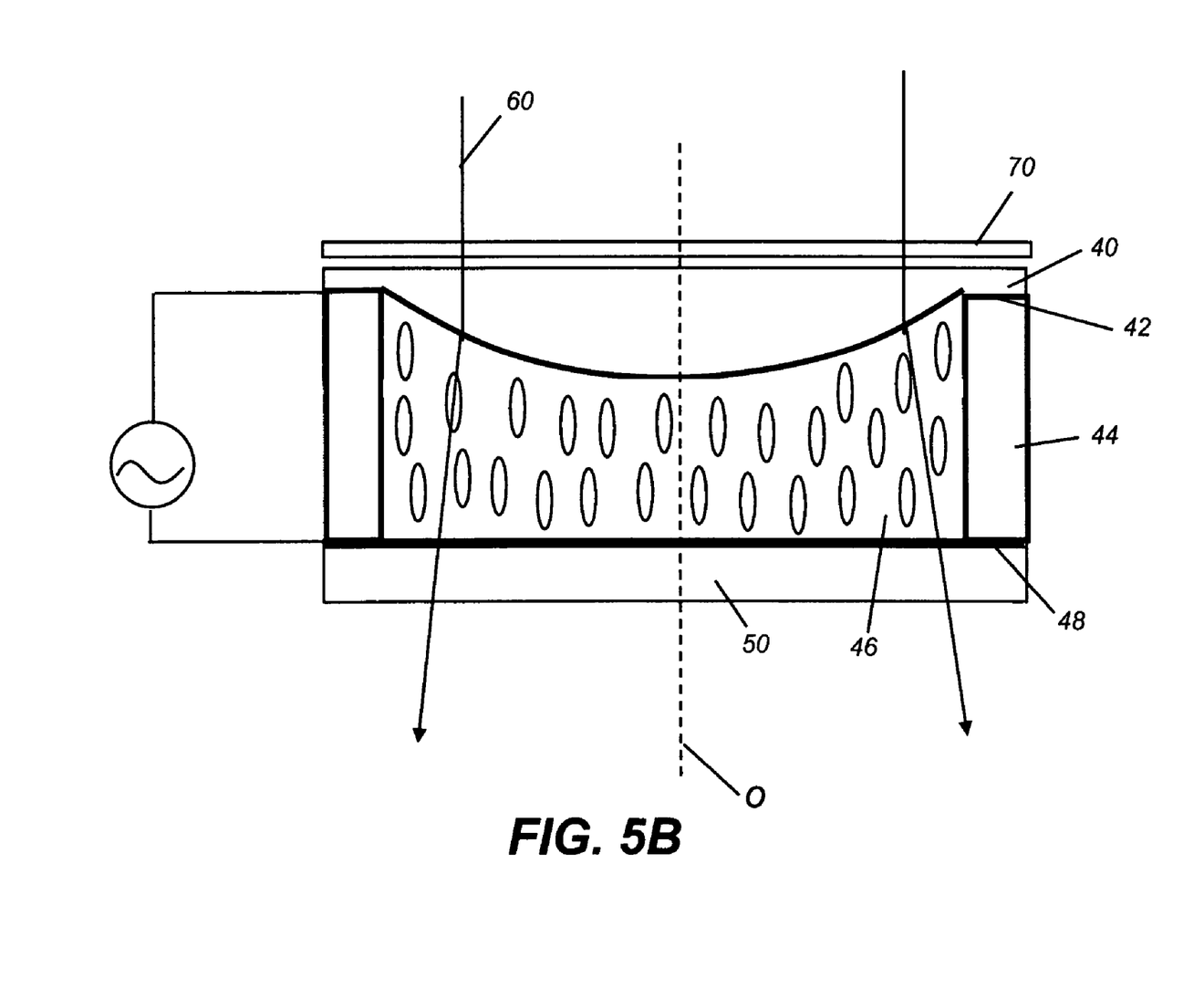

Yet, another embodiment is shown in FIGS. 5A and 5B. In this configuration, the liquid crystal is sandwiched between the first solid optical element 40, whose refractive index is smaller than that of the liquid crystal material 46, and the second optical element 50. The first solid optical element 40 is a convex cylindrical lens and the ITO is coated on this surface to form the electrode 42. Another electrode 48 is coated on the surface of the second solid optical element 50. When applied voltage as in FIG. 5B, the liquid crystal molecules is reoriented perpendicular to the substrate by the inhomogeneous electric field. The effective refractive index of the liquid crystal material is smaller than that without voltage, which means the optical power of the liquid crystal lens in FIG. 5B is weaker. When this embodiment is used for zoom flash, FIG. 5A shows the characteristic behavior of liquid crystal lens 24 at a wide angle mode. FIG. 5B shows the characteristic behavior of liquid lens 24 at a telephoto position. In contrast, if the refractive index of first solid optical element 40 is larger than that of the liquid crystal material 46, when applied voltage, the optical power of the liquid crystal lens 24 is stronger.

A number of different liquid crystal materials could be used in the liquid crystal lens 24 of the present invention. For example, gradient polymer-network liquid crystal (PNLC) and gradient refractive index nanoscale polymer-dispersed liquid crystal (GRIN PDLC). For some materials, such as PNLC, the lens performance is polarization dependent, a polarizer is required in front of the liquid crystal lens to condition the input light. A reflective polarizer 70 in FIGS. 3A to 5B is used to polarize the light passing through the liquid crystal lens 24 when the polarization dependent type of liquid crystal material is used.

Flash Apparatus 24 Embodiments

Figure 6:
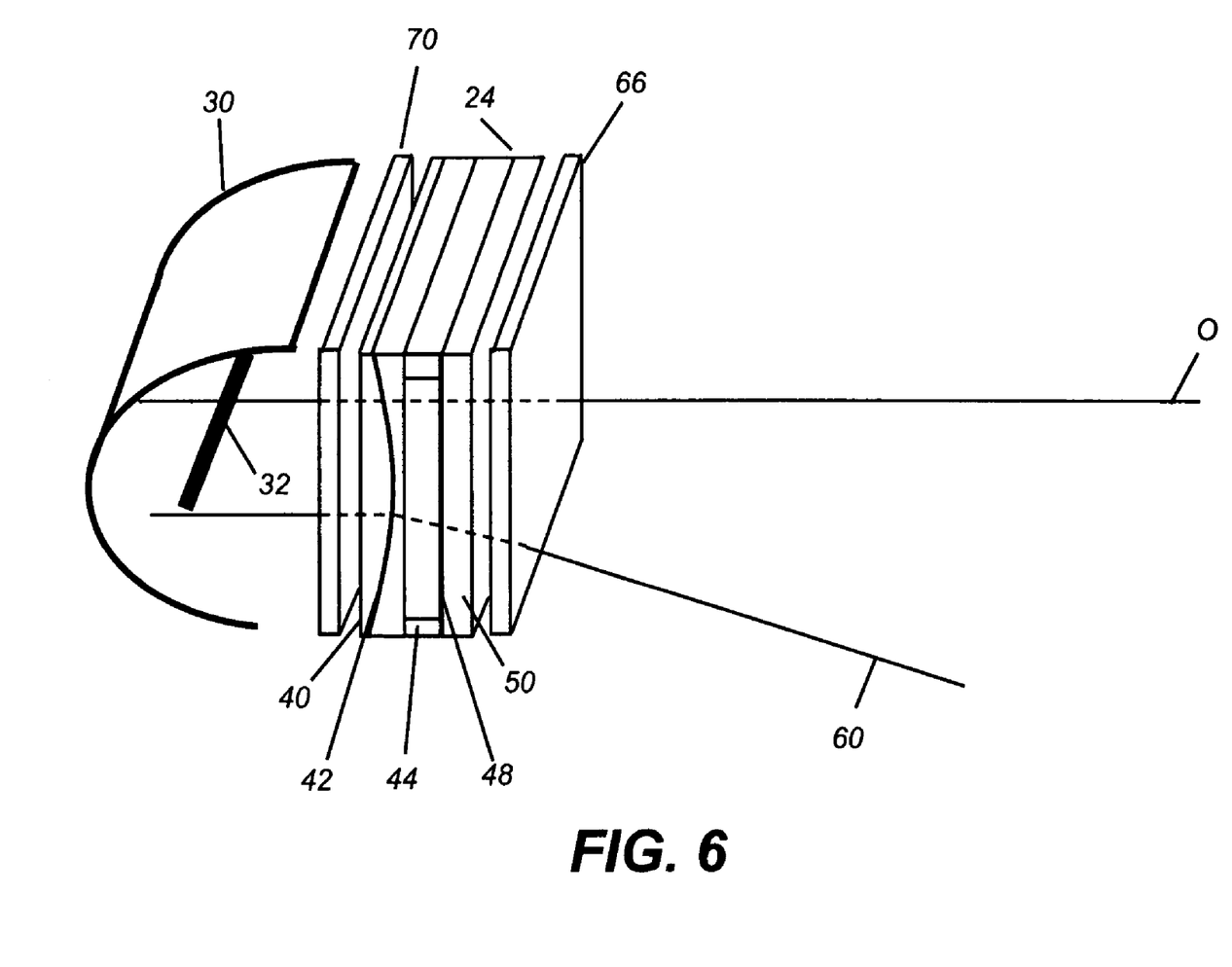
FIG. 6 is a configuration of a zoom flash apparatus.

Referring to FIG. 6, there is shown, an embodiment of the zoom flash apparatus with variable cylindrical liquid crystal lens. The light from the cylindrical light source 32 is collimated by the reflector 30. The reflective polarizer 70 and depolarization element 66 in the figure are optional. They can be used to improve the light efficiency when the liquid crystal material used in the liquid lens has a polarization dependent performance. The reflective polarizer 70 reflects half the light from the light source 32 back to the reflector 30. The reflected light will be reflected by the reflector 30 again and reaches the polarizer. If the polarization state of the reflected light changes upon the reflection on reflector 30, the light will pass though the polarizer 70. Otherwise, the light will be reflected back to the reflector again. This process will continue until the entire light pass through the polarizer 70 and then the liquid crystal lens. The light passed through the liquid lens is polarized, which maybe an issue for some applications. A depolarization element 66, such as a weak diffuser, can be used to depolarize the light so that the light reaches the object is unpolarized.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the first solid optical element can be an element with different types of surface, other than cylindrical surface, such as spherical surface, aspherical surface, and aspherical cylindrical surface. Also the surfaces of the second solid optical element can have different shapes other than flat. While the apparatus and methods described herein are well suited to use with zoom flash devices, this solution could also be used to serve other applications where variable angle illumination is required. A zoom flash apparatus utilizing liquid crystal lens optics could be integral to the camera body itself, as is represented in FIG. 1, could protrude from the camera, could be separable from the camera as needed, or could be a separate unit altogether. Flash apparatus 24 of the present invention could be particularly well suited to an inexpensive camera, such as so-called "single-use" cameras. The range of available focus settings could be as few as two discrete, fixed settings or could be continuously adjustable over a range, set manually or using an automatic mechanism. Because the liquid crystal lens is used for illumination rather than for high-resolution imaging, precision shaping of the first solid optical element is unnecessary, provided that light distribution is within needed levels and at suitable angles.

Thus, what is provided is an apparatus and method for a flash illumination apparatus capable of operation at variable scene coverage angles.

PARTS LIST 10 camera apparatus
12 zoom lens
14 control logic processor
16 shutter control
18 actuator
20 flash apparatus
22 recording medium
24 liquid crystal lens
30 reflector
32 light source
38 positional sensor
40 first solid optical element
42 first electrode
44 chamber
46 liquid crystal material
48 second electrode
50 second solid optical element
52 index matching material
60 ray
66 depolarization element
70 polarizer

The invention claimed is:
1. A zoom flash comprising:
a first solid optical element;
a liquid crystal element;
a first electrode between the first optical element and the liquid crystal element;
a second solid optical element;
a second electrode between the liquid crystal element and the second optical element;
an electronic controller for applying a voltage across the first and second electrodes;
wherein an optical power of the liquid crystal element changes according to the voltage applied;
a light source on a side of the first optical element opposite the first electrode; and
wherein light passing through the first, liquid crystal, and second optical elements is redirected by the elements and wherein a diffuser is located adjacent the second optical element on a side of the second optical element opposite the second optical electrode.

2. The zoom flash of claim 1 wherein the first solid optical element has a concave cylindrical surface.

3. The zoom flash of claim 1 wherein the first solid optical element has a convex cylindrical surface.

4. The zoom flash of claim 1 wherein the light source is a light emitting device (LED).

5. The zoom flash of claim 1 wherein a reflector is located on a side of the light source opposite the first optical element.

6. The zoom flash of claim 1 wherein a third optical element is located between the first electrode and liquid crystal element and the face of the third optical element adjacent to the first electrode is convex.

7. The zoom flash of claim 6 wherein the third optical element has an index of refraction that matches an index of refraction of the first optical element.

8. The zoom flash of claim 1 wherein a third optical element is located between the first electrode and the liquid crystal element and the face of the third optical element adjacent to the first electrode is concave.

9. The zoom flash of claim 8 wherein the third optical element has an index of refraction that matches an index of refraction of the first optical element.

10. The zoom flash of claim 1 wherein the surfaces of the second solid optical element are not flat.

11. A zoom flash comprising:
a first solid optical element;
a liquid crystal element;
a first electrode between the first optical element and the liquid crystal element;
a second solid optical element;
a second electrode between the liquid crystal element and the second optical element;
an electronic controller for applying a voltage across the first and second electrodes;
wherein an optical power of the liquid crystal element changes according to the voltage applied;
a light source on a side of the first optical element opposite the first electrode; and
wherein light passing through the first, liquid crystal, and second optical elements is redirected by the elements and wherein a reflective polarizer is located between the light source and the first optical element.

12. A zoom flash comprising:
a first solid optical element;
a liquid crystal element;
a first electrode between the first optical element and the liquid crystal element;
a second solid optical element;
a second electrode between the liquid crystal element and the second optical element;
an electronic controller for applying a voltage across the first and second electrodes;
wherein an optical power of the liquid crystal element changes according to the voltage applied;
a light source on a side of the first optical element opposite the first electrode; and
wherein light passing through the first, liquid crystal, and second optical elements is redirected by the elements and wherein the optical power of the liquid crystal element is greater at an edge than at a center of the liquid crystal element.

13. A zoom flash comprising:
a first solid optical element;
a liquid crystal element;
a first electrode between the first optical element and the liquid crystal element;
a second solid optical element;
a second electrode between the liquid crystal element and the second optical element;
an electronic controller for applying a voltage across the first and second electrodes;
wherein an optical power of the liquid crystal element changes according to the voltage applied;
a light source on a side of the first optical element opposite the first electrode; and
wherein light passing through the first, liquid crystal, and second optical elements is redirected by the elements and wherein at least one of the electrodes is either concave or convex.

* * * * *